United States Patent [19]
Webel

[11] Patent Number: 5,647,262
[45] Date of Patent: Jul. 15, 1997

[54] CUTTING DEVICE FOR CUTTING SCRAP METAL

[75] Inventor: Achim Webel, Niestetal, Germany

[73] Assignee: Thyssen Industrie AG, Essen, Germany

[21] Appl. No.: 396,338

[22] Filed: Feb. 28, 1995

Related U.S. Application Data

[63] Continuation of Ser. No. 19,604, Feb. 18, 1993, abandoned.

[30] Foreign Application Priority Data

Feb. 18, 1992 [DE] Germany ............... 42 04 841.9

[51] Int. Cl.⁶ .................................................. B26D 1/08
[52] U.S. Cl. ........................ 83/823; 83/821; 83/828; 83/694
[58] Field of Search ....................... 83/821, 823, 824, 83/827, 828, 859, 694, 697, 640

[56] References Cited

U.S. PATENT DOCUMENTS

| | | | |
|---|---|---|---|
| 3,623,388 | 11/1971 | Gottling et al. | 83/640 |
| 4,220,063 | 9/1980 | Kiemer et al. | 83/640 |
| 4,932,301 | 6/1990 | Buck | 83/694 |
| 5,047,607 | 9/1991 | Briffod | 219/69.12 |
| 5,056,394 | 10/1991 | Manschwetus | 83/699.11 |

FOREIGN PATENT DOCUMENTS

| | | | |
|---|---|---|---|
| 0311889 | 4/1989 | European Pat. Off. | 83/859 |
| 3929183 | 9/1989 | Germany . | |
| 0087110 | 3/1989 | Japan | 83/821 |
| 0321112 | 12/1989 | Japan | 83/821 |

Primary Examiner—Eugenia Jones
Assistant Examiner—Charles Goodman
Attorney, Agent, or Firm—Robert W. Becker & Associates

[57] ABSTRACT

A cutting device for cutting scrap metal has a support frame with slide guides connected thereto. A blade slide is vertically slidable in the slide guides along a travel path. A first blade is connected to the blade slide, and a second blade is fixedly connected to the support frame and cooperates with the first blade to perform the shearing action. Elastic elements cooperate with the blade slide such that the blade slide is movable essentially perpendicular to a plane of the shearing action against the bias of the elastic elements to thereby form a wider gap between the first and the second blades.

10 Claims, 5 Drawing Sheets

CUTTING DEVICE FOR CUTTING SCRAP METAL

This application is a continuation of application Ser. No. 08/019,604 filed Feb. 18, 1993, now abandoned.

BACKGROUND OF THE INVENTION

The present invention relates to a cutting device for cutting scrap metal, the device comprising a support frame, slide guides connected to the support frame, a blade slide connected to the slide guides so as to be vertically slidable along a travel path, a first blade connected to the blade slide, and a second blade fixedly connected to the support frame and cooperating with a first blade to perform a shearing action.

It is a well known problem with cutting devices of the prior art that especially as a function of the scrap metal quality, the scrap metal composition, and the blade geometry of the cutting blades, the scrap metal is more or less frequently pulled into the shearing gap so that the blade slide jams. The forces acting on the blade slide, the blade slide guiding system, and the support frame in such situations can be so high that the maximum allowable force of the hydraulic blade drive is no longer sufficient to pull back the blade slide. In such instances it is necessary to remove the scrap metal causing the jam from the shearing gap. However, this is a very laborious task.

Furthermore, a great jamming force may result in permanent deformations at the blade slide, at its guiding system and at the support frame. A compensation of the resulting deformation is very complicated and results in an extended downtime of the cutting device.

In order to solve this problem German patent 39 29 183 suggests a scrap metal cutting device in which the guiding system of the blade slide, in contrast to known guiding systems that are form-locked to the support frame, is detachably connected with screw connections to the columns of the support frame.

When in this device scrap metal is pulled into the shearing gap and jams the device, it is possible to remove the scrap metal piece in a comparably simple manner by loosening one or both slide guides from the resulting widened shearing gap.

However, with this substantial time and labor expenditures with respect to loosening the screws of the slide guides, it is still not possible to prevent the jamming of the cutting device by scrap metal being caught in the shearing gap, and a permanent deformation of parts of the cutting device which considerably reduce the performance of the cutting device cannot be prevented.

It is therefore an object of the present invention to provide a cutting device of the aforementioned kind with which the scrap metal pulled into the shearing gap will not result in deformations of the cutting device and in the resulting reduced performance and in which the scrap metal can be removed from the sharing gap with time and labor reduced expenditures.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
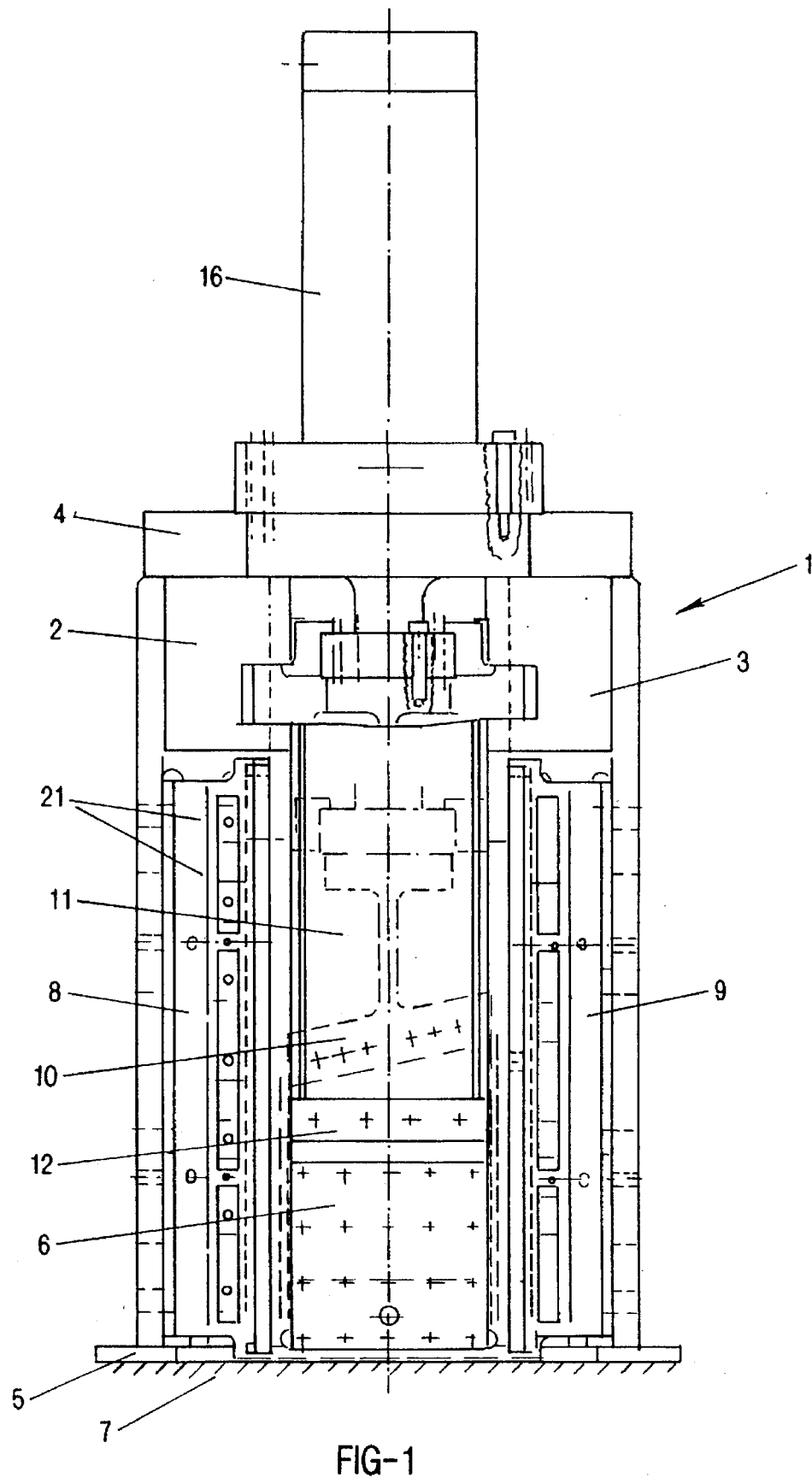
FIG. 1 is an end view of the inventive cutting device.

The cutting device for cutting scrap metal according to the present invention is primarily characterized by a support frame, slide guides connected to the support frame, a blade slide connected to the slide guides so as to be vertically slidable along a travel path, a first blade connected to the blade slide, a second blade fixedly connected to the support frame and cooperating with the first blade to perform a shearing action, and elastic elements for cooperating with the blade slides such that the blade slide is movable essentially perpendicular to a plane of the shearing action against the bias of the elastic elements to thereby form a wider gap between the first and the second blades.

The inventively gained advantages result essentially in that the blade slide, when a shearing force component of a predetermined size acts in the horizontal direction, can be displaced away from its plane of movement, yielding in the horizontal direction against the bias of the elastic elements to form a wider shearing gap. In this displaced position of the blade slide, jamming force is substantially smaller than the force of the hydraulic blade drive so that the blade slide, despite the acting jamming force, can be retracted. The scrap metal part is released simply by this movement.

The elastic elements are dimensioned such that even with a horizontal displacement (yielding) away from the plane of shearing movement the elasticity of these elements remains such that deformations of the cutting device due to scrap metal jammed within the shearing gap cannot occur. When the elastic elements are in the form of spring elements, the residual spring travel corresponds to the remaining elasticity.

It is preferable that the slide guides are movable essentially perpendicular to the plane of the shearing action against the bias of the elastic elements.

Preferably, the elastic elements have a prestress. Expediently, the prestress of a first set of the elastic elements coordinated with a first one of the slide guides differs from the average prestress of a second set of elastic elements coordinated with a second one of the slide guides. Advantageously, the first slide guide is fixedly connected to the support frame and the second slide guide is connected together with the second set of the elastic elements to the support frame.

In a preferred embodiment of the present invention, the elastic elements are individual elements distributed essentially over the entire travel path of the blade slide. The individual elements are preferably annular spring elements. Each annular spring element advantageously comprises a pressure plate, a pressure flange, and an annular spring interposed between the pressure plate and the pressure flange, and further comprises receiving screws for connecting the pressure plate to the pressure flange and for generating the prestress.

Advantageously, screw connections are provided for connecting the slide guides and the elastic elements to the support frame.

Expediently, a first elastic element extends on one vertical side of the blade slide and a second elastic element extends on the other vertical side of the blade slide essentially over the entire travel path of the blade slide. The slide guides and the elastic elements, viewed in a direction perpendicular to the plane of the shearing action, are connected to the support frame in a form-locking manner.

Preferably, the blade slide has first guiding surfaces and the slide guides have second guiding surfaces, wherein the first guiding surfaces and the second guiding surfaces have an essentially constant curvature substantially conforming to one another for guiding the blade slide along the travel path.

Basically, there are two arrangements for the elastic elements. The two arrangements can also be combined with one another. In a first arrangement, the blade slide is arranged relative to its slide guides in a horizontally elastic manner and the slide guides are rigidly connected to the support frame. In a second arrangement, the blade slide is rigidly guided and the slide guides at the support frame are connected in a horizontally elastic manner so that the movement of one or both slide guides results in a limited movement of the blade slide. The subsequently described further developments of the latter embodiment of the invention can be applied also to the first embodiment.

It is, for example, possible to select the average prestress of the slide guides of the blade slide to differ from one another whereby it is also possible that one of the slide guides is rigidly connected to the support frame. Thus, a displacement of the blade slide results in a shearing gap of varying width.

When using a slanted blade it is expedient to provide the slide guide, corresponding to the side of the blade that comes into contact with the scrap metal first, with a decreased prestress in order to be able to provide, if needed, a widening of the shearing gap of a sufficient size.

The elastic elements are preferably individual elements that are distributed essentially over the entire travel path of the blade slide. However, it is also possible to provide each slide guide with only one elastic element that essentially extends over the entire travel path of the blade slide.

DESCRIPTION OF THE PREFERRED EMBODIMENTS

The present invention will now be described in detail with the aid of several specific embodiments utilizing FIGS. 1 through 5.

Figure 2:
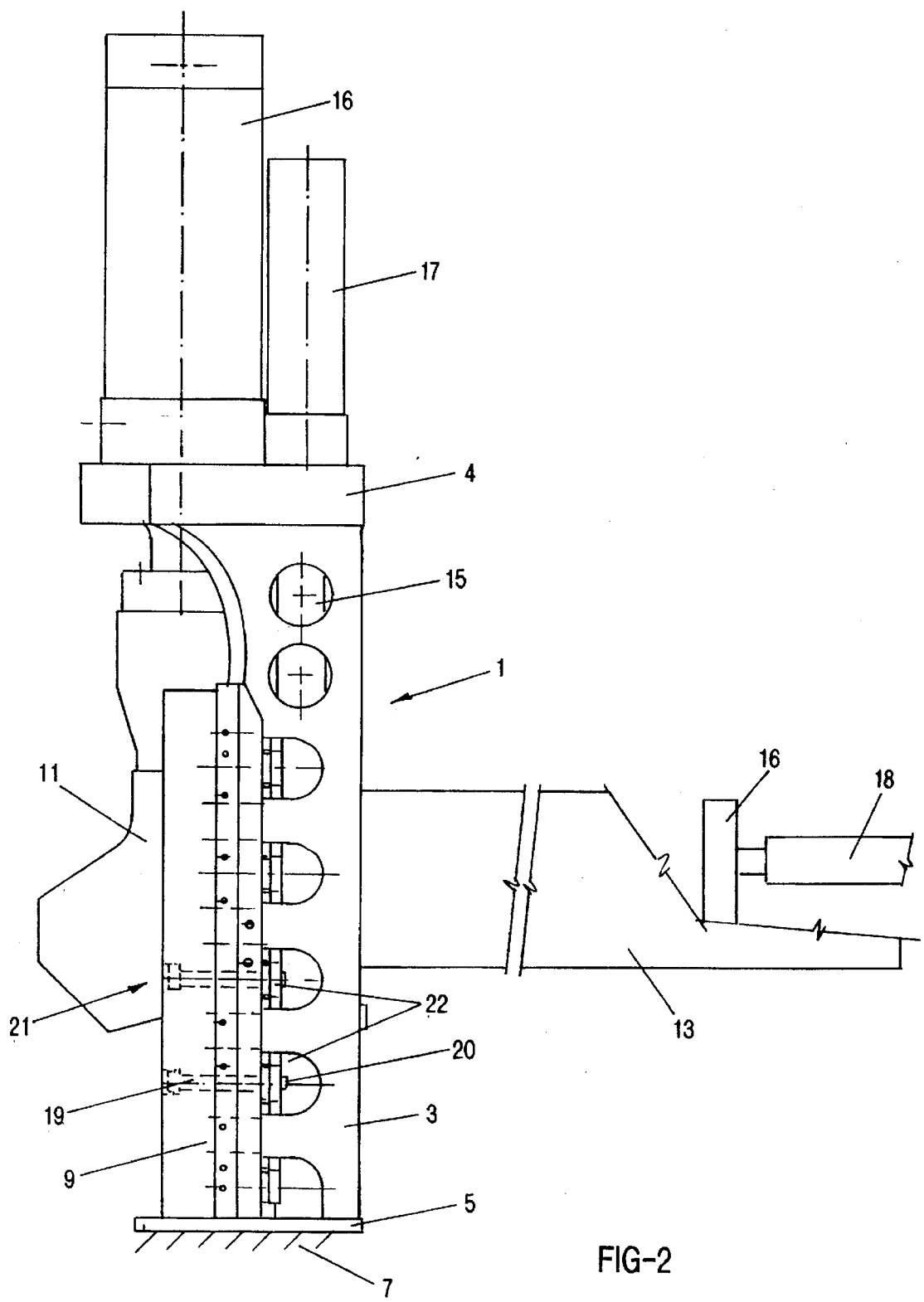
FIG. 2 is a side view of the cutting device according to FIG. 1.

The cutting device represented in FIGS. 1 and 2 is comprised of a support frame 1, having columns 2, 3 connected to one another at the top by a transverse beam 4 and at the bottom by a base plate 5 supporting a lower blade holder 6. The base plate 5 is connected to a foundation 7. The columns 2, 3 of the support frame 1 are provided with slide guides 8, 9 in which the blade slide 11 supporting the upper blade 10 is vertically slidably arranged. The slanted upper blade 10 cooperates during the shearing action with the lower blade 12 that is rigidly connected to the lower blade holder 6. A feeding channel 13 for receiving the scrap metal is provided with a longitudinally slidable stamp 14. The scrap metal, which is pushed past the shearing plane by the stamp 14 in order to prepare for the shearing process, is engaged by a ram 15 which is arranged in front of the shearing blades 10, 12 and vertically slidably guided at the support frame 1. The ram 15 optionally compresses the scrap metal and furthermore serves to hold the scrap metal in place during the shearing process. The actuation of the blade slide 11 supporting the upper blade 10, of the ram 15 and of the stamp 14 is achieved by hydraulic drives in the form of cylinder-piston-arrangements 16, 17, and 18.

As can be seen in FIG. 2, the slide guide 9, as well as the corresponding slide guide 8 shown in FIG. 1, is connected by a screw 19 and nut 20, forming a screw connection 21, to the column 3 of the support frame 1, i.e., slide guide 8 is connected to column 2. Between the respective inner surface of the column 3 (or column 2) and the nut 20 an annular spring element 22 is provided the annular spring element 22 is prestressed by screws as further discussed below.

Figure 3:
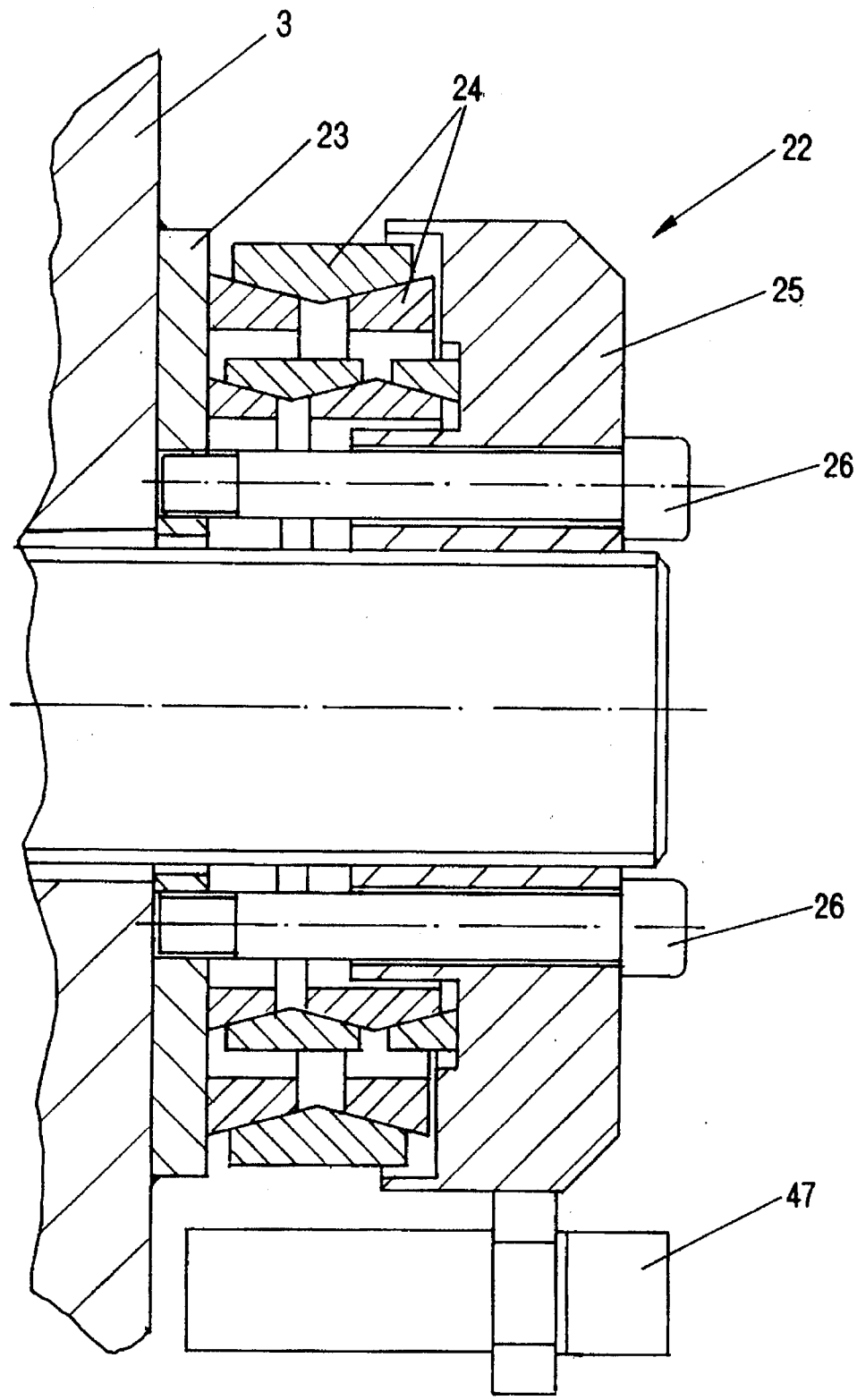
FIG. 3 shows an annular spring element in a detailed representation.

According to FIG. 3 the annular spring element 22 (elastic element) is comprised of a pressure plate 23, an annular spring 24, and a pressure flange 25. Via the receiving screw 26 connecting the pressure plate 23 and the pressure flange 25, the annular spring element 22 is adjusted to the required prestress. This prestress is maintained at least long enough to achieve the screw connection 21. In an alternative, the nut 20 may be replaced with the pressure flange 25 provided with a corresponding thread. After being mounted, the pressure plate 23, as shown in the drawing, can be welded to the inner side of the respective column 2 or 3.

Figure 4:
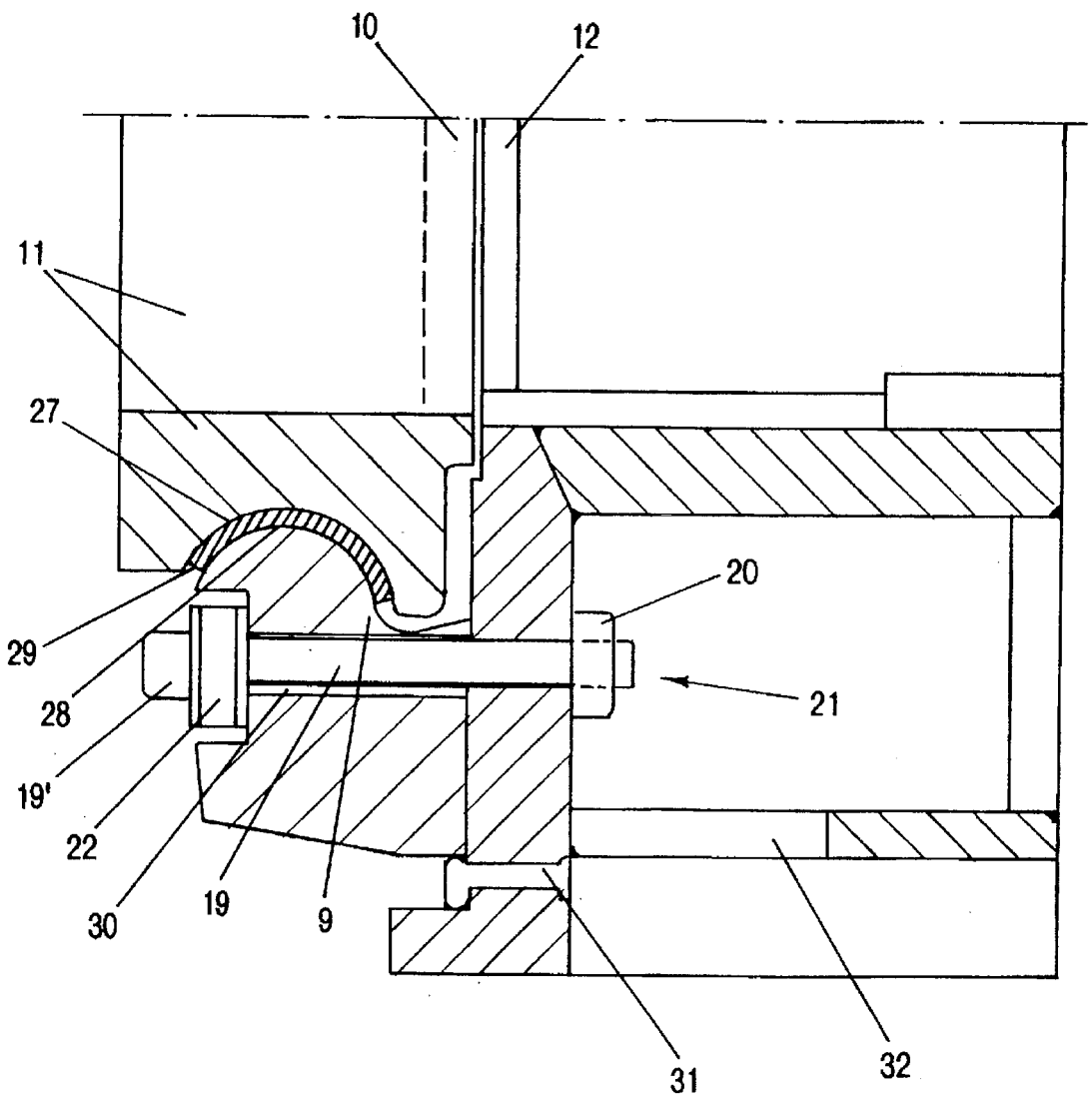
FIG. 4 shows a horizontal section of one side of the support frame at the level of one inventive element for connecting the slide guide to the support frame.

In the embodiment according to FIG. 4 the prestressed annular spring element 22, in an alternative to the arrangement of FIG. 2 and FIG. 3, is located between the screw head 19' of the screw 19 and the slide guide 9. It is also possible to provide a prestressed annular spring element 22 on both ends of the screw connection 21 wherein both annular spring elements are prestressed in the manner discussed previously. Furthermore, the position of screw 19 and nut 20 can be switched.

The cooperating guiding surfaces 27, 28 at the blade slide 11 and at the slide guides 8, 9 for vertically guiding the blade slide 11 are provided with an essentially constant radius of curvature substantially corresponding to one another. Accordingly, the elastic yielding of the blade slide 11 does not result in increased surface pressure of individual areas of the guiding surfaces 27, 28 and increased wear at the guiding lines 29 of this embodiment. When the guiding lines 29 are worn, resulting in an increased play between the blade slide 11 and the slide guides 8, 9, an adjustment of the slide guides 8, 9 can be performed by loosening the screw connections 21, by displacing one or both slide guides 8, 9 at the slotted holes 30 in the direction of the blade slide 11, by replacing a compensation body 31 with one of a required size, and by subsequently retightening the screw connection 21.

In order to facilitate these operations as well as the initial mounting of the screw connections 21, the end of the screw connection 21 that is provided with the nut is accessible through an opening 32 within the column 3 of the support frame 1.

Figure 5:
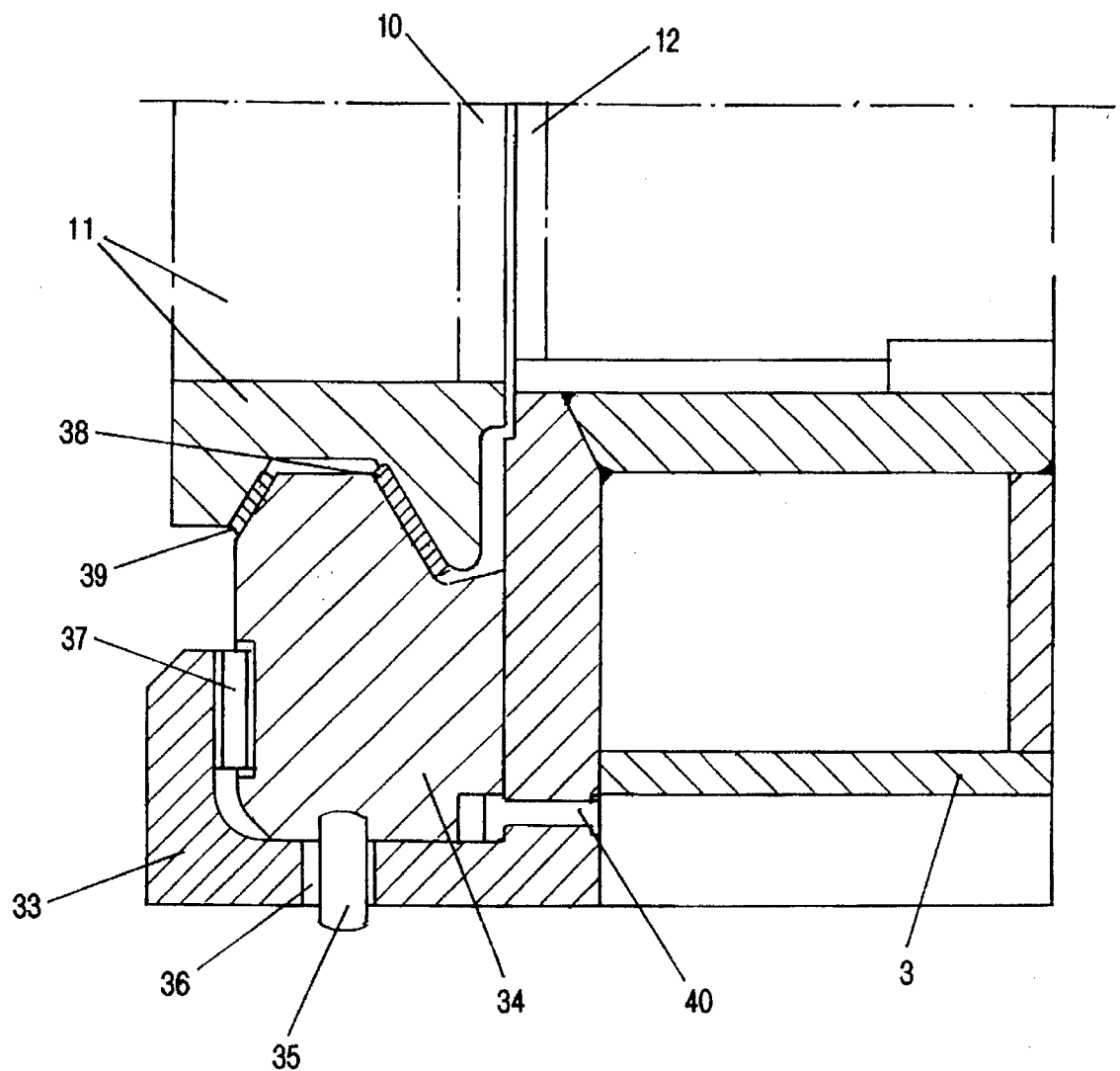
FIG. 5 shows a section according to FIG. 4 with another inventive embodiment of a connecting element.

According to the embodiment of FIG. 5, an angle member 33 is a part of the column 3 of the support frame 1. A slide guide 34 is provided with bolts 35 which engage horizontally arranged slotted holes 36 of the angle member 33. Between the free end of the angle member 33 and the slide guide 34 an elastic layer 37 is provided which extends continuously essentially over the entire length of the slide guide 34. When a liquid encapsuled in a solid body is used as the elastic layer 37, the hydraulic pressure within the system is a measure for the achieved prestress. When the prestress is surpassed, liquid is withdrawn from the system via a pressure limiting valve. The liquid is subsequently reintroduced into the system in order to restore the initial stage.

A trapezoidal guiding system is provided at the slide guide 34 for the blade slide 11 provided with a corresponding recess. This type of guiding system of the blade slide 11 is predominantly used for scrap metal that exhibits a relatively small resistance during the shearing action and thus results in neglectable deformations of the blade slide 11. In order to compensate the different loads of the trapezoidal guide during the shearing action, the slide track 38 has a greater effective surface than the slide track 39. In order to compensate for excessive play at the trapezoidal guiding system, the slide guide 34 is moved in the direction toward the blade slide 11, and its end position is determined by a compensation body 40. In preparation for the shearing process, the scrap metal present in the feeding channel 13 is displaced by the stamp 14 into the shearing area and held in position by the ram 15. Due to the vertical movement of the blade slide 11 the scrap metal is cut between the upper blade 10 connected to the blade slide 11 and the lower blade 12 rigidly connected to the holder 6.

When the scrap metal contains components with low resistance which can be bent by the upper knife 10 into the shearing gap and/or when the upper knife 10 shows wear especially at the cutting edges, the blade slide 11 with the upper blade 10 tends to move out of the normal operating shearing plane. However, this movement is prevented up to a predetermined prestress resulting from the sum of the prestresses of the individual elastic elements 22, 37. Only after surpassing this predetermined prestress, the normal operation of the cutting device is interrupted such that the blade slide 11 is moved out of the normal shearing plane resulting in a wider shearing gap. A jamming of the scrap metal thus occurs within the enlarged shearing gap. Such a jamming in general can be eliminated by removing the blade slide 11 in the upward direction. When in extreme cases the jamming force is so great that the blade slide cannot be displaced, the required displacement can be achieved by increasing the prestress of the annular spring elements 22 with the receiving screws 26.

The frequency and the type of yielding of the blade slide 11 provide a means for determining the the degree of wear at the upper blade 10 and the lower blade 12. For this purpose, as represented in FIG. 3, a sensor 41 within the area of the annular spring element 22 is provided which measures distance changes of the pressure flanges 25 relative to the side of the column 3 of the support 1 which correspond to the distance changes of the opposite side of the column 3 of the support frame 1 relative to the slide guide 8, 9, 34. Furthermore, the sensor 41 serves to determine the remaining residual elastic travel of the annular spring element 22 so that, in order to prevent breakdowns, the cutting device may be turned off upon reaching a minimal residual elastic travel.

The present invention is, of course, in no way restricted to the specific disclosure of the specification and drawings, but also encompasses any modifications within the scope of the appended claims.

What I claim is:

1. A cutting device for cutting scrap metal, said cutting device comprising:

a support frame;

slide guides connected to said support frame;

a blade slide slidably connected to said slide guides so as to be vertically slidable on said slide guides along a travel path;

a first blade connected to said blade slide;

a second blade fixedly connected to said support frame and cooperating with said first blade to perform a shearing action; and elastic elements for elastically connecting at least one of said slide guides to said support frame such that said blade slide is moved essentially perpendicular to a plane of said shearing action against a prestress of a predetermined value of said elastic elements to thereby widen a gap between said first and said second blades, when a shearing force component acting in a horizontal direction surpasses the predetermined prestress value of said elastic elements.

2. A cutting device according to claim 1, wherein the predetermined prestress value of a first set of said elastic elements connecting a first one of said slide guides to said support frame differs from the predetermined prestress value of a second set of said elastic elements connecting a second one of said slide guides to said support frame.

3. A cutting device according to claim 1, wherein a first one of said slide guides is fixedly connected to said support frame and wherein a second one of said slide guides is connected with said elastic elements to said support frame.

4. A cutting device according to claim 1, wherein said elastic elements are individual elements distributed essentially over said entire travel path of said blade slide.

5. A cutting device according to claim 4, wherein said individual elements are annular spring elements.

6. A cutting device according to claim 5, wherein each said annular spring element comprises a pressure plate, a pressure flange, and an annular spring interposed between said pressure plate and said pressure flange, and further comprising receiving screws for connecting said pressure plate to said pressure flange and for generating the prestress.

7. A cutting device according to claim 1, further comprising screw connections for connecting said slide guides and said elastic elements to said support frame.

8. A cutting device according to claim 1, wherein said blade slide has first guiding surfaces and wherein said slide guides each have a second guiding surface, said first guiding surfaces and said second guiding surfaces having an essentially constant radius of curvature substantially corresponding to one another for guiding said blade slide along the travel path.

9. A cutting device according to claim 1, wherein a first one of said elastic elements extends on one vertical side of said blade slide and a second one of said elastic elements extends on the other vertical side of said blade slide essentially over said entire travel path of said blade slide.

10. A cutting device according to claim 1, wherein said slide guides and said elastic elements, viewed in a direction perpendicular to the plane of said shearing action, are connected to said support frame in a form-fitting manner.

* * * * *